(No Model.)
I. W. LITCHFIELD & T. W. SANFORD.
TREAD FOR BICYCLE PEDALS.
No. 558,400. Patented Apr. 14, 1896.
Fig. I.
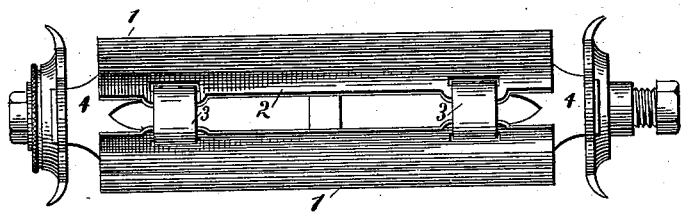
Fig. II.
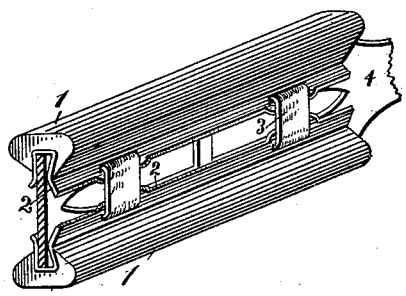
Fig. III.
Witnesses                                Inventors.

UNITED STATES PATENT OFFICE.

ISAAC W. LITCHFIELD AND TOWNSEND W. SANFORD, OF WARWICK, NEW YORK.

TREAD FOR BICYCLE-PEDALS.

SPECIFICATION forming part of Letters Patent No. 558,400, dated April 14, 1896.

Application filed April 11, 1894. Serial No. 507,193. (No model.)

*To all whom it may concern:*

Be it known that we, ISAAC W. LITCHFIELD and TOWNSEND W. SANFORD, citizens of the United States, residing at Warwick, county of Orange, State of New York, have invented certain new and useful Improvements in Treads for Bicycle-Pedals, of which the following is a specification.

Light roadsters and other forms of bicycles are, as is well known, furnished with a rat-trap pedal, which is a light form of pedal whose treads are made up of two parallel plates which stand vertically to the sole of the foot of the rider and have sharpened projections on their edges, preventing the slipping of the foot. The pedal is of very light weight and is preferably used on the road by those who wish to ride swiftly; but the form of the pedal is such that when the rider wishes to use it without his regular bicycle-shoes injury to the shoes and to the foot of the rider results.

Our invention is designed to afford a means of readily protecting the shoes and foot of the rider from injury by the sharp projections of the rat-trap pedal. To this end we provide treads which are readily applicable to and removable from the blades of the rat-trap pedal.

Referring to the accompanying drawings, which form a part of this specification, Figure I is a side view of a rat-trap pedal having our improvements applied thereto. Fig. II is a perspective view of one form of our improved detachable tread. Fig. III is an edge view of an elastic ligature detached.

The removable tread consists, preferably, as shown in Fig. II, of two rubber or other wear surfaces 1, formed on or applied to U-shaped bars 2, which, with rubber, spiral-spring; or other suitable spring ligatures 3, form a clamp holding the treads 1 1 in position.

The method of applying the invention to a rat-trap pedal is indicated in Fig. I, where the metal blade of the pedal is shown at 4, having both its edges protected by a removable tread of the form shown in Fig. II.

In the form of the device shown in Fig. II, to prevent longitudinal movement of the tread by causing it to bind on the rat-trap blade we preferably make the arm of the U support bar 2, which is engaged by the spring ligature 3 in the angular form shown in Fig. II, so that the spring-tension of the ligatures 3 will cause the angles of said bars 2 to bind upon the rat-trap blade. One of the ligatures 3 is shown detached in Fig. III. Its ends are secured by riveting or sewing, with or without the addition of linen to strengthen it, to hold the tread-pieces together and into engagement with the pedal-blade.

Having thus described our invention, the following is what we claim as new therein and desire to secure by Letters Patent:

A removable tread for the rat-trap blade of a bicycle-pedal consisting of two opposing U-shaped bars 2, 2 having wear-treads 1, 1 and elastic ligatures 3 or other springs 3, 3 arranged to connect the bars in pairs whereby they can be sprung into engagement with the rat-trap blade, substantially as set forth.

ISAAC W. LITCHFIELD.
TOWNSEND W. SANFORD.

Witnesses:
MORRIS RUTHERFORD,
A. M. REYNOLDS, Jr.